United States Patent [19]

Sen

[11] Patent Number: 4,980,572
[45] Date of Patent: * Dec. 25, 1990

[54] GENERATION OF ELECTRICITY USING GRAVITATIONAL ENERGY

[75] Inventor: Asim K. Sen, Ottawa, Canada

[73] Assignee: Synchrosat Limited, Ottawa, Canada

[ * ] Notice: The portion of the term of this patent subsequent to Jul. 25, 2006 has been disclaimed.

[21] Appl. No.: 124,172

[22] Filed: Jan. 25, 1988

Related U.S. Application Data

[63] Continuation of Ser. No. 747,920, Jun. 24, 1985, abandoned.

[51] Int. Cl.⁵ .............................................. F03G 3/08
[52] U.S. Cl. ..................................... 290/1 R; 417/229
[58] Field of Search ......................... 290/1 R; 417/229

[56] References Cited

U.S. PATENT DOCUMENTS

| | | | |
|---|---|---|---|
| 1,916,873 | 7/1933 | Wiggins | 290/1 R |
| 3,859,589 | 1/1975 | Rush | 290/1 R |
| 3,885,163 | 5/1975 | Toberman | 290/1 R |
| 4,238,687 | 12/1980 | Martinez | 290/1 R |
| 4,239,975 | 12/1980 | Chiappetti | 290/1 R |
| 4,247,785 | 1/1981 | Apgar | 290/1 R |

FOREIGN PATENT DOCUMENTS 0008411 1/1977 Japan ................................ 290/1 R

*Primary Examiner*—A. D. Pellinen
*Assistant Examiner*—W. E. Duncanson, Jr.

[57] ABSTRACT

This invention relates to a scheme for generating electricity using gravitational energy. The scheme uses a set of massive underground spinning wheels, each wheel being fitted with a mechanism to receive and transmit gravitational torque pulses from a passing vehicle to keep the wheels in motion. The mechanism used to apply the torque pulses to the spinning wheels consists of a stepping board, a hollow cylindrical rod disposed vertically and a shoe attached to the lower end of the vertical rod by a hinge with the upper end of the rod protruding above the ground surface. A steel linkage connecting the stepping board and the lower part of the shoe is used for initial positioning of the shoe. Both the stepping board and the protruding end of the vertical rod are kept in their initial upward positions by means of two springs. The electricity is generated by using each spinning wheel in combination with an appropriate gear system to act as the prime mover of an alternator.

3 Claims, 1 Drawing Sheet

GENERATION OF ELECTRICITY USING GRAVITATIONAL ENERGY

This is a continuation of application Ser. No. 06/747,920, filed June 24, 1985, now abandoned.

This invention relates to a scheme for generating electricity using gravitational energy.

Each day, an enormous amount of gravitational energy is lost as trapped energy under the wheels of moving vehicles. The energy is lost as trapped energy because the force, Mg, associated with the gravitational energy acts downwards and, in the normal operation of the vehicle, the said force is in no way capable of causing any vertical displacement, h, of the moving vehicle to produce any useful work, Mgh. Also, since the force, Mg, associated with the gravitational energy acts downwards and is, therefore, normal to the direction of motion of the moving vehicle, it is clear that, in an ideal scheme, any use of this gravitational force to produce useful power will not create any extra torque demand on the motor or engine which drives the vehicle.

The scheme described herein uses a massive underground wheel which is suitably disposed to receive torque pulses from a passing vehicle as a result of gravitational forces. This underground wheel in combination with an appropriate gear system will then act as the prime mover of an alternator which will produce the electricity. In a practical realization of this scheme, a number of such underground wheels and generator units will be placed along a circular path of the passing vehicle and this will then ensure that the electricity can be generated on a more stable and continuous basis. One may note that the passing vehicle which is moving in a circular path will practically be kept in motion by its own momentum and it will only require a small amount of real power to overcome frictional losses. It is believed that the amount of this real power to overcome frictional losses will be somewhat higher due to the resistances offered by the mechanism used to apply the gravitational torque pulses to each underground wheel.

The mechanism used to apply the gravitational torque to each underground wheel is comprised of a stepping board, a hollow cylindrical rod disposed vertically and a shoe attached to the lower end of the cylindrical rod by a hinge with the upper end of the rod protruding above the ground surface. The initial positioning of the shoe is accomplished by a linkage connecting the stepping board and the lower part of the shoe, the linkage being threaded along the central hole of the cylindrical rod. A pair of spring is also used to keep both the stepping board and the protruding end of the vertical rod in their initial upward positions. The complete mechanism works as follows: When the stepping board is lowered by the weight of the passing vehicle, it initially positions the shoe gently pressing it against the wall of the wheel rim. Immediately following this initial positioning of the shoe, the protruding end of the vertical rod is pushed down momentarily to apply the required torque to the underground wheel. This mechanism is believed to be new and its use in the present scheme facilitates the conversion of gravitational energy into useful electrical power with much improved efficiency.

Prior arts relating to the invention disclosed herein revealed several earlier patents. In the scheme described in Canadian patent No. 1082769 "Method and apparatus for generating electricity by vehicle and pedestrian weight force" issued July 29, 1980 to Wayne P. LeVan, the actuating mechanism is comprised of a vertically disposed screw member connected to a driving gear through a unidirectional clutch. The arrangement is such that downward displacement of the screw member causes the clutch to engage the driving gear and then effects its rotation. In the other scheme described in Canadian patent No. 1025048 "Low output transmitter" issued Jan. 24, 1978 to Atsushi Naito, it is seen that a more complicated mechanism using a spring and a lever is employed to rotate the driving gear. Other similar schemes patented earlier include: K. Sato (Japan#0008411, January 1977), E. B. Wiggins (U.S. Pat. No. 1,916,873, July 4, 1933), C. E. Toberman (U.S. Pat. No. 3,885,163, May 20, 1975), S. Martinez (U.S. Pat. No. 4,238,687, Dec. 9, 1980) and A. B. Chiappetti (U.S. Pat. No. 4,239,975, Dec. 16, 1980). One may note that, in none of these earlier schemes, a massive wheel has been used to receive the torque pulses from the passing vehicle. It is believed that the use of this massive wheel and the associated actuating mechanism in the present scheme will not only ensure a more stable and continuous rotation of the driving gear, but it will also result in increased efficiency and power gain in the overall system.

DETAILED DESCRIPTION

Figure 1:
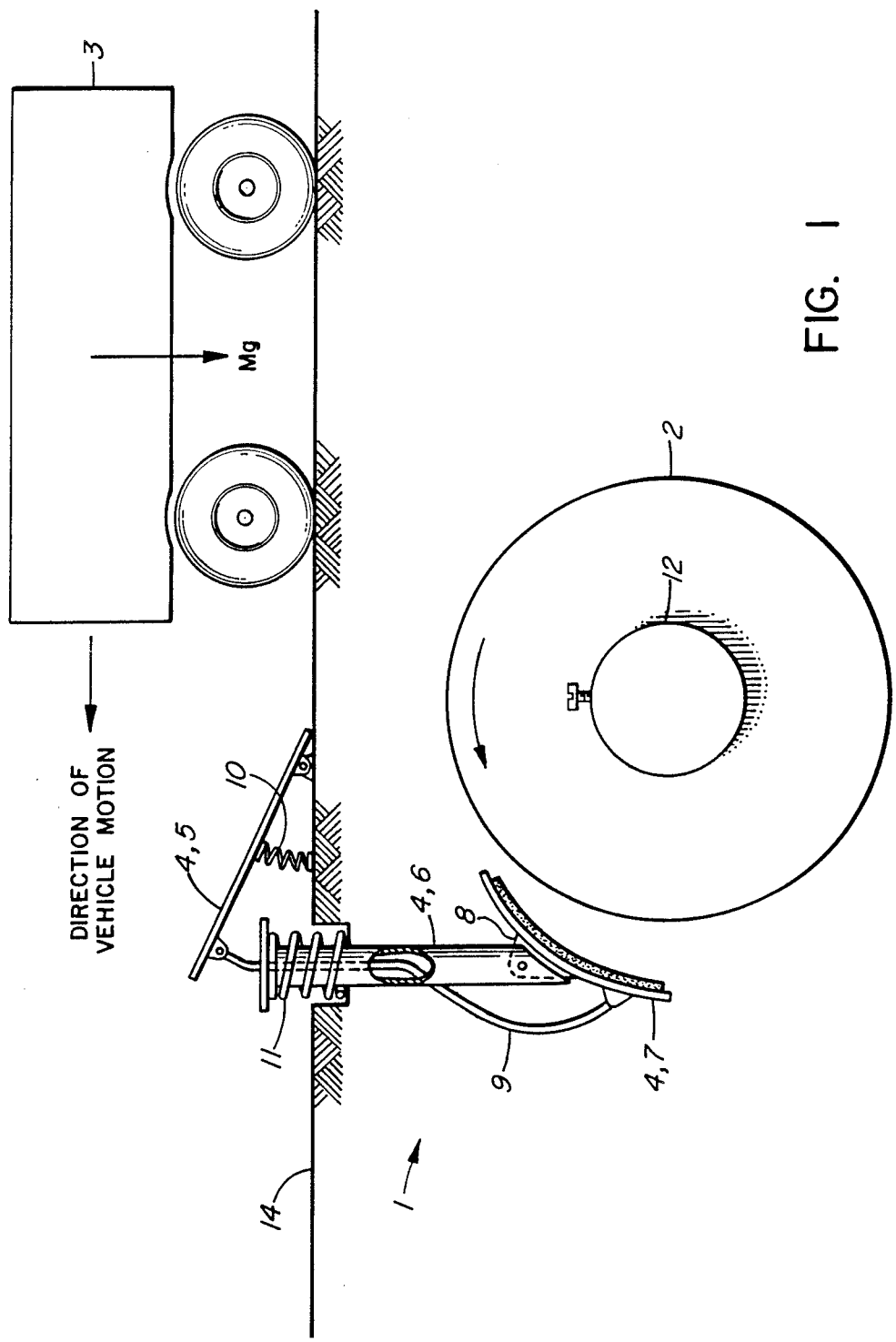
FIG. 1 shows a diagramatic view of the invention.

Referring to FIG. 1, there is shown a gravitational energy system 1 comprised of a massive underground wheel 2. The underground wheel 2 is suitably disposed to receive gravitational torque pulses from a passing vehicle 3. The torque pulses are applied by means of a mechanism 4 composed of a stepping board 5, a hollow cylindrical rod 6 which is disposed vertically and a shoe 7 attached to the lower end of the cylindrical rod 6 by a hinge 8 with the upper end of the rod 6 protruding above the ground surface 14. As shown in FIG. 1, a steel linkage 9 threaded along the central hole of the cylindrical rod 6, connects the stepping board 5 and the lower part of the shoe 7 and this is used for initial positioning of the shoe 7. Also, the springs 10 and 11 are used to keep both the stepping board 5 and the protruding end of the cylindrical rod 6 in their initial upward positions, respectively. Finally, the underground wheel 2 is coupled to the prime mover of an alternator 12 through an appropriate gear arrangement.

I claim:

1. A set of massive underground spinning wheels wherein each wheel is fitted with a mechanism to receive and transmit torque pulses from a passing vehicle, the vehicle moving along a circular path with a constant velocity, the said mechanism transmitting the torque pulsed to each wheel by making momentary contacts at the wheel rim, being comprised of a stepping board, a hollow cylindrical rod disposed vertically and a shoe attached to the lower end of the cylindrical rod by a hinge with the upper end of the rod protruding above the ground surface, the stepping board and the producing end of the vertical rod each being provided with a separate "recocking" spring, a strong unbendable metal linkage connecting the stepping board and the lower end of the shoe and treaded along the central hole of the cylindrical rod being used for initial positioning of the shoe while the protruding end of the rod applying the gravitational torque pulses to the wheel rims to keep the wheels in motion, each wheel being coupled to act as the prime mover of an alternator through an appropriate gear arrangement to produce electricity.

2. The set of massive underground spinning wheels of claim 1 wherein the path of the passing vehicle is a roadway.

3. The set of massive underground spinning wheels of claim 1 wherein the path of the passing vehicle is a city beltway.

* * * * *